United States Patent
Hayek et al.

(10) Patent No.: US 11,674,403 B2
(45) Date of Patent: Jun. 13, 2023

(54) ANNULAR SHROUD ASSEMBLY

(71) Applicant: General Electric Company, Schenectady, NY (US)

(72) Inventors: Michael Elia Hayek, Wrentham, MA (US); Tyler Frederick Hooper, Amesbury, MA (US); Megan Lynn Williams, Woodfin, NC (US); Jonathan David Baldiga, Amesbury, MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/215,539

(22) Filed: Mar. 29, 2021

(65) Prior Publication Data

US 2022/0307383 A1 Sep. 29, 2022

(51) Int. Cl.
| | | |
|---|---|---|
| *F01D 11/08* | (2006.01) | |
| *F01D 11/02* | (2006.01) | |
| *F01D 9/04* | (2006.01) | |
| *F01D 25/24* | (2006.01) | |
| *F01D 11/00* | (2006.01) | |

(52) U.S. Cl.
CPC .............. *F01D 11/025* (2013.01); *F01D 9/04* (2013.01); *F01D 11/005* (2013.01); *F01D 11/08* (2013.01); *F01D 25/246* (2013.01); *F05D 2220/32* (2013.01); *F05D 2230/60* (2013.01); *F05D 2240/11* (2013.01)

(58) Field of Classification Search
CPC ...... F01D 11/08; F01D 11/005; F01D 11/025; F01D 11/12; F01D 11/14; F01D 11/16; F01D 11/20; F01D 11/22; F01D 25/005; F01D 9/04–048; F01D 25/246
See application file for complete search history.

(56) References Cited

U.S. PATENT DOCUMENTS

| | | |
|---|---|---|
| 814,757 A | 3/1906 | Wilkinson |
| 3,039,739 A | 6/1962 | Leland |
| 4,076,455 A | 2/1978 | Stargardter |
| 5,228,828 A | 7/1993 | Damlis et al. |
| 6,638,006 B2 | 10/2003 | Selby |
| 6,733,235 B2 | 5/2004 | Alford et al. |
| 8,162,597 B2 | 4/2012 | LeJars et al. |
| 8,740,552 B2 * | 6/2014 | Marusko .................. F01D 9/04 415/173.1 |

(Continued)

*Primary Examiner* — J. Todd Newton
*Assistant Examiner* — Behnoush Haghighian
(74) *Attorney, Agent, or Firm* — Dority & Manning, P.A.

(57) ABSTRACT

A shroud assembly including a shroud support and an annular shroud is provided. The shroud assembly includes one or more pins for securing the annular shroud to the shroud support. The pins having a block capable of translating radially to allowing the shroud to expand and contract in the radial direction. A gas turbine engine having a compressor section, a combustion section, a turbine section and a shroud assembly is also provided. The shroud assembly includes one or more pins for securing the continuous shroud to the shroud support. The pins having a block capable of translating radially to allowing the shroud to expand and contract in the radial direction. Methods for assembling a shroud assembly structure in a gas turbine engine are also provided.

18 Claims, 12 Drawing Sheets

(56) References Cited

U.S. PATENT DOCUMENTS

| | | | | |
|---|---|---|---|---|
| 8,753,073 | B2* | 6/2014 | Albers | F01D 25/246 |
| | | | | 415/173.3 |
| 8,834,105 | B2* | 9/2014 | Albers | F01D 25/246 |
| | | | | 415/173.1 |
| 8,905,709 | B2* | 12/2014 | Dziech | F01D 25/246 |
| | | | | 415/173.1 |
| 9,726,043 | B2* | 8/2017 | Franks | F01D 11/12 |
| 9,945,257 | B2* | 4/2018 | Fitzpatrick | F01D 25/246 |
| 10,012,100 | B2* | 7/2018 | Vetters | F01D 11/12 |
| 10,053,999 | B2* | 8/2018 | McCaffrey | F01D 11/12 |
| 10,184,352 | B2 | 1/2019 | O'Leary et al. | |
| 10,240,476 | B2* | 3/2019 | Varney | F01D 11/005 |
| 10,371,008 | B2* | 8/2019 | Sippel | F01D 5/284 |
| 10,378,387 | B2* | 8/2019 | Baldiga | F01D 11/08 |
| 10,711,630 | B2* | 7/2020 | Waldman | F01D 11/003 |
| 11,193,392 | B2* | 12/2021 | Frey | F01D 11/02 |
| 11,286,813 | B2* | 3/2022 | Danis | F01D 25/243 |
| 2017/0204737 | A1* | 7/2017 | Varney | F01D 11/24 |
| 2017/0268359 | A1* | 9/2017 | Frey | F01D 11/02 |

* cited by examiner

ANNULAR SHROUD ASSEMBLY

This invention was made with Government support under W58RGZ-16-C-0047 awarded by the U.S. Army. The Government has certain rights in this invention.

FIELD

The present subject matter relates generally to gas turbine engines. More particularly, the present subject matter relates to shroud assemblies for gas turbine engines.

BACKGROUND

The efficiency of a gas turbine engine is dependent upon many factors, one of which is the radial clearance between adjacent rotating and non-rotating components, such as, the rotor blade tips and the shroud surrounding the outer tips of the rotor blades. If the clearance is too great, an unacceptable degree of gas leakage will occur with a resultant loss in efficiency. If the clearance is too little, there is a risk that under certain conditions contact will occur between the components.

During operation, temperature differentials across the engine frequently result in the rotating and non-rotating components radially expanding and contracting at different rates. Accordingly, in order to maintain proper clearance between the rotor blade tips and the shroud during thermal expansion and contraction, improved shroud assemblies are needed.

BRIEF DESCRIPTION

In one aspect, embodiments of the present disclosure relate to a shroud assembly. The shroud assembly includes a shroud support and an annular shroud defining a radial centerline along the circumferential direction. The annular shroud including one or more shroud retention features having a circumferential surface. For example, the annular shroud can include three or more shroud retention features. One or more pins are also provided for securing the annular shroud to the shroud support. For example, in embodiments three or more pins are provided for securing the annular shroud to the shroud support. Each pin has an outer pin coupled to an inner pin, the inner pin disposed radially inward from the outer pin. The inner pin having a block thereon capable of radially translating along the inner pin. The block engages the circumferential surface of the one or more retention features for securing the annular shroud to the shroud support.

In another aspect, embodiments of the present disclosure relate to a gas turbine engine. The gas turbine engine includes a compressor section, a combustion section, and a turbine section in serial flow relationship and together defining a core air flowpath. The gas turbine engine includes a shroud assembly positioned in at least one of the compressor section or the turbine section and at least partially defining the core air flowpath, the shroud assembly comprising a support structure and an annular shroud defining a radial centerline along the circumferential direction. The annular shroud comprising one or more retention features having a circumferential surface configured to engage one or more pins for securing the annular shroud to the support structure, each of the one or more pins having an outer pin coupled to the support structure and an inner pin disposed radially inward from the outer pin, the inner pin having a block thereon capable of radially translating along the inner pin. The block engages the circumferential surface of the one or more retention features for securing the annular shroud to the support structure.

In yet another aspect, embodiments of the present disclosure relate to a method for assembling a shroud assembly structure in a gas turbine engine. The method includes providing at least a portion of a gas turbine engine having one or more shroud support structures, the one or more shroud support structures having a radially inner surface; disposing an annular shroud clearance tool between the radially inner surface of the shroud support structure and an annular shroud to ensure clearance between the radially inner surface and the annular shroud, the annular shroud having one or more shroud retention features; disposing a block in the one or more shroud retention features, the block coupled to an inner pin that is coupled to an outer pin, the block capable of translating in the radial direction with respect to the inner pin; rotating the outer pin or inner pin to translate the block such that the block frictionally engages a circumferential surface on the one or more shroud retention features coupling the annular shroud to the block; optionally, adjusting a torque of the pin to further secure the annular shroud to the block; optionally, securing the outer pin to the shroud support structure; and removing the annular shroud clearance tool.

BRIEF DESCRIPTION OF THE DRAWINGS

The above and other aspects, features, and advantages of the present disclosure will become more apparent in light of the subsequent detailed description when taken in conjunction with the accompanying drawings in which.

DETAILED DESCRIPTION

Figure 1:
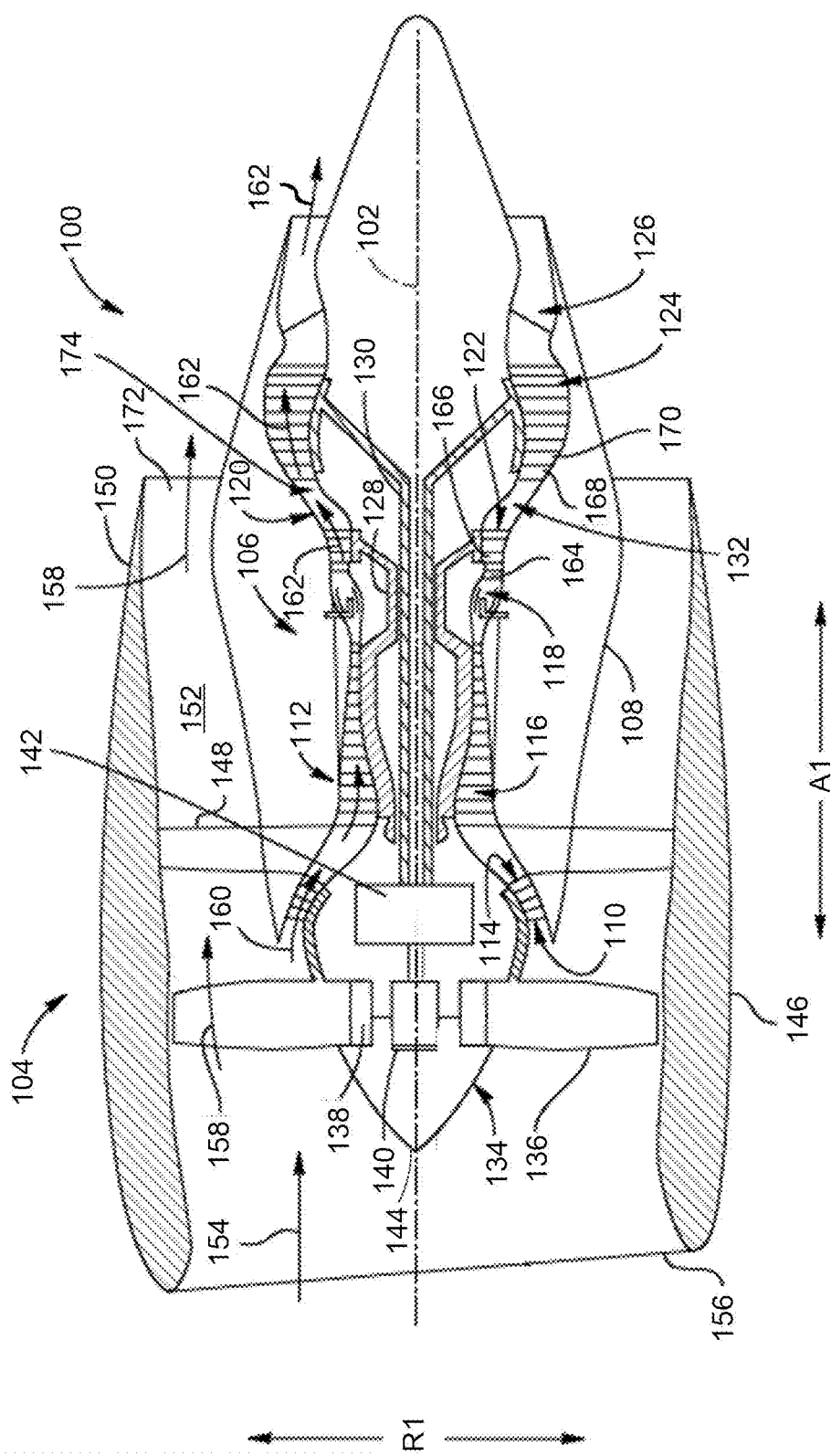
FIG. 1 is a schematic cross-sectional view of an exemplary gas turbine engine according to various embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows. "HP" denotes high pressure and "LP" denotes low pressure.

Further, as used herein, the terms "axial" or "axially" refer to a dimension along a longitudinal axis of an engine. The term "forward" used in conjunction with "axial" or "axially" refers to a direction toward the engine inlet, or a component being relatively closer to the engine inlet as compared to another component. The term "rear" used in conjunction with "axial" or "axially" refers to a direction toward the engine exhaust nozzle, or a component being relatively closer to the engine exhaust nozzle as compared to another component. The terms "radial" or "radially" refer to a dimension extending between a center longitudinal axis (or centerline) of the engine and an outer engine circumference. Radially inward is toward the longitudinal axis and radially outward is away from the longitudinal axis.

The present disclosure can include, consist essentially of, or consist of, the components of the present disclosure as well as other materials described herein. As used herein, "consisting essentially of" means that the composition or component may include additional materials, but only if the additional materials to not materially alter the basic and novel characteristics of the claimed composition or methods.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although exemplary embodiments of the present invention will be described generally in the context of a turbine shroud incorporated into a turbofan jet engine for purposes of illustration, one of ordinary skill in the art will readily appreciate that embodiments of the present invention may be applied to any turbine incorporated into any turbomachine and are not limited to a gas turbofan jet engine unless specifically recited in the claims.

Exemplary aspects of the present disclosure are directed to shroud assemblies that include an annular shroud coupled to a support structure. During operation of a gas turbine engine, the shroud experiences thermal expansion and contraction due to different operating temperatures. As the shroud expands or contracts it is important that the shroud remains centered along a radial centerline to provide for the appropriate clearance between blades and the shroud.

Furthermore, the turbine shroud directly affects overall efficiency or performance of the gas turbine engine due to the size of the tip clearance. The turbine shroud additionally affects performance of the engine since any compressor discharge and/or bleed air used for cooling the turbine shroud is therefore not used during the combustion process or the work expansion process by the turbine blades and is unavailable for producing useful work. Accordingly, it is desirable to control or reduce the amount of bleed air used in cooling the turbine shroud for maximizing the overall efficiency of the engine. It is also desirable to use CMC materials in the shroud because they have a higher temperature capability than metallic type materials.

Thus, in one aspect provided is a shroud assembly including a shroud support and an annular shroud. The annular shroud is continuous along the circumferential direction, thus not requiring splines to radially seal shroud segments, effectively reducing the number of components in the shroud assembly, reducing the complexity of the assembly, and reducing the bleed air required to purge the end gaps. Furthermore, the shroud assembly includes one or more pins for securing the annular shroud to the support structure. The pins include an outer pin secured to the shroud support and an inner pin having a block thereon. The inner pin is offset from the center line of the outer pin, which allows for securely maintaining centralization of the annular shroud to the engine centerline. Also, the offset inner pin creates a camming mechanism, where rotation of the inner pin translates the block. The block engages the annular shroud and can translate in a radial direction, thereby allowing for thermal expansion or contraction of the annular shroud while maintaining the position of the annular shroud about a radial centerline. Improved sealing may result in improved engine performance and efficiency.

Referring now to the drawings, FIG. 1 is a schematic cross-sectional view of a gas turbine engine 100 in accordance with an exemplary embodiment of the present disclosure. More particularly, for the embodiment of FIG. 1, the gas turbine engine 100 is an aeronautical, high-bypass turbofan jet engine configured to be mounted to an aircraft, such as in an under-wing configuration or tail-mounted configuration. As shown in FIG. 1, the gas turbine engine 100 defines an axial direction A1 (extending parallel to or coaxial with a longitudinal centerline 102 provided for reference) and a radial direction R1. In general, the gas turbine engine 100 includes a fan section 104 and a core turbine engine 106 disposed downstream from the fan section 104.

The exemplary core turbine engine 106 depicted generally includes a substantially tubular outer casing 108 that defines an annular inlet 110. The outer casing 108 encases, in serial flow relationship, a compressor section 112 including a first, booster or LP compressor 114 and a second, HP compressor 116; a combustion section 118; a turbine section 120 including a first, HP turbine 122 and a second, LP turbine 124; and a jet exhaust nozzle section 126. A HP shaft or spool 128 drivingly connects the HP turbine 122 to the HP compressor 116. A LP shaft or spool 130 drivingly connects the LP turbine 124 to the LP compressor 114. The compressor section, combustion section 118, turbine section, and jet exhaust nozzle section 126 together define a core air flowpath 132 through the core turbine engine 106.

Referring still the embodiment of FIG. 1, the fan section 104 includes a variable pitch fan 134 having a plurality of fan blades 136 coupled to a disk 138 in a circumferentially spaced apart manner. As depicted, the fan blades 136 extend outwardly from disk 138 generally along the radial direction R. Each fan blade 136 is rotatable relative to the disk 138 about a pitch axis by virtue of the fan blades 136 being operatively coupled to a suitable actuation member 140 configured to collectively vary the pitch of the fan blades 136, e.g., in unison. The fan blades 136, disk 138, and actuation member 140 are together rotatable about the longitudinal centerline 102 by LP shaft 130 across a power gear box 142. The power gear box 142 includes a plurality of gears for stepping down the rotational speed of the LP shaft 130 to a more efficient rotational fan speed.

Referring still to the exemplary embodiment of FIG. 1, the disk 138 is covered by rotatable front nacelle 144 aerodynamically contoured to promote an airflow through the plurality of fan blades 136. Additionally, the exemplary fan section 104 includes an annular fan casing or outer nacelle 146 that circumferentially surrounds the fan 134 and/or at least a portion of the core turbine engine 106. Moreover, for the embodiment depicted, the nacelle 146 is supported relative to the core turbine engine 106 by a plurality of circumferentially spaced outlet guide vanes 148. Further, a downstream section 150 of the nacelle 146 extends over an outer portion of the core turbine engine 106 so as to define a bypass airflow passage 152 therebetween.

During operation of the gas turbine engine 100, a volume of air 154 enters the gas turbine engine 100 through an associated inlet 156 of the nacelle 146 and/or fan section 104. As the volume of air 154 passes across the fan blades 136, a first portion of the air 154 as indicated by arrows 158 is directed or routed into the bypass airflow passage 152 and a second portion of the air 154 as indicated by arrow 160 is directed or routed into the LP compressor 114. The pressure of the second portion of air 160 is then increased as it is routed through the high pressure (HP) compressor 116 and into the combustion section 118.

Referring still to FIG. 1, the compressed second portion of air 160 from the compressor section mixes with fuel and is burned within the combustion section 118 to provide combustion gases 162. The combustion gases 162 are routed from the combustion section 118 along the hot gas path 174, through the HP turbine 122 where a portion of thermal and/or kinetic energy from the combustion gases 162 is extracted via sequential stages of HP turbine rotor blades 164 that are coupled to the outer casing 108 and HP turbine rotor blades 166 that are coupled to the HP shaft or spool 128, thus causing the HP shaft or spool 128 to rotate, thereby supporting operation of the HP compressor 116. The combustion gases 162 are then routed through the LP turbine 124 where a second portion of thermal and kinetic energy is extracted from the combustion gases 162 via sequential stages of LP turbine stator vanes 168 that are coupled to the outer casing 108 and LP turbine rotor blades 170 that are coupled to the LP shaft or spool 130, thus causing the LP shaft or spool 130 to rotate, thereby supporting operation of the LP compressor 114 and/or rotation of the fan 134.

The combustion gases 162 are subsequently routed through the jet exhaust nozzle section 126 of the core turbine engine 106 to provide propulsive thrust. Simultaneously, the pressure of the first portion of air 158 is substantially increased as the first portion of air 158 is routed through the bypass airflow passage 152 before it is exhausted from a fan nozzle exhaust section 172 of the gas turbine engine 100, also providing propulsive thrust. The HP turbine 122, the LP turbine 124, and the jet exhaust nozzle section 126 at least partially define a hot gas path 174 for routing the combustion gases 162 through the core turbine engine 106.

It will be appreciated that the exemplary gas turbine engine 100 depicted in FIG. 1 is by way of example only, and that in other exemplary embodiments, the gas turbine engine 100 may have any other suitable configuration. Additionally, or alternatively, aspects of the present disclosure may be utilized with any other suitable aeronautical gas turbine engine, such as a turboshaft engine, turboprop engine, turbojet engine, low bypass turbofan engine etc. Further, aspects of the present disclosure may further be utilized with any other land-based gas turbine engine, such as a power generation gas turbine engine, or any aeroderivative gas turbine engine, such as a nautical gas turbine engine.

It will be appreciated that in other exemplary embodiments, aspects of the present disclosure may be incorporated into any other exemplary gas turbine engine. For example, in other exemplary embodiments, aspects of the present disclosure may be incorporated into a turboshaft engine. In such a case, the gas turbine engine may not include a fan section, an outer nacelle, or an array of outlet guide vanes extending between the cowling of the gas turbine engine and the nacelle of the gas turbine engine (e.g. through a bypass airflow passage). Further, with such a configuration, the gas turbine engine may be coupled to a load, such as to an electric generator, a rotor assembly (e.g., when incorporated into a helicopter), etc., through a low pressure shaft of the engine.

Figure 2:
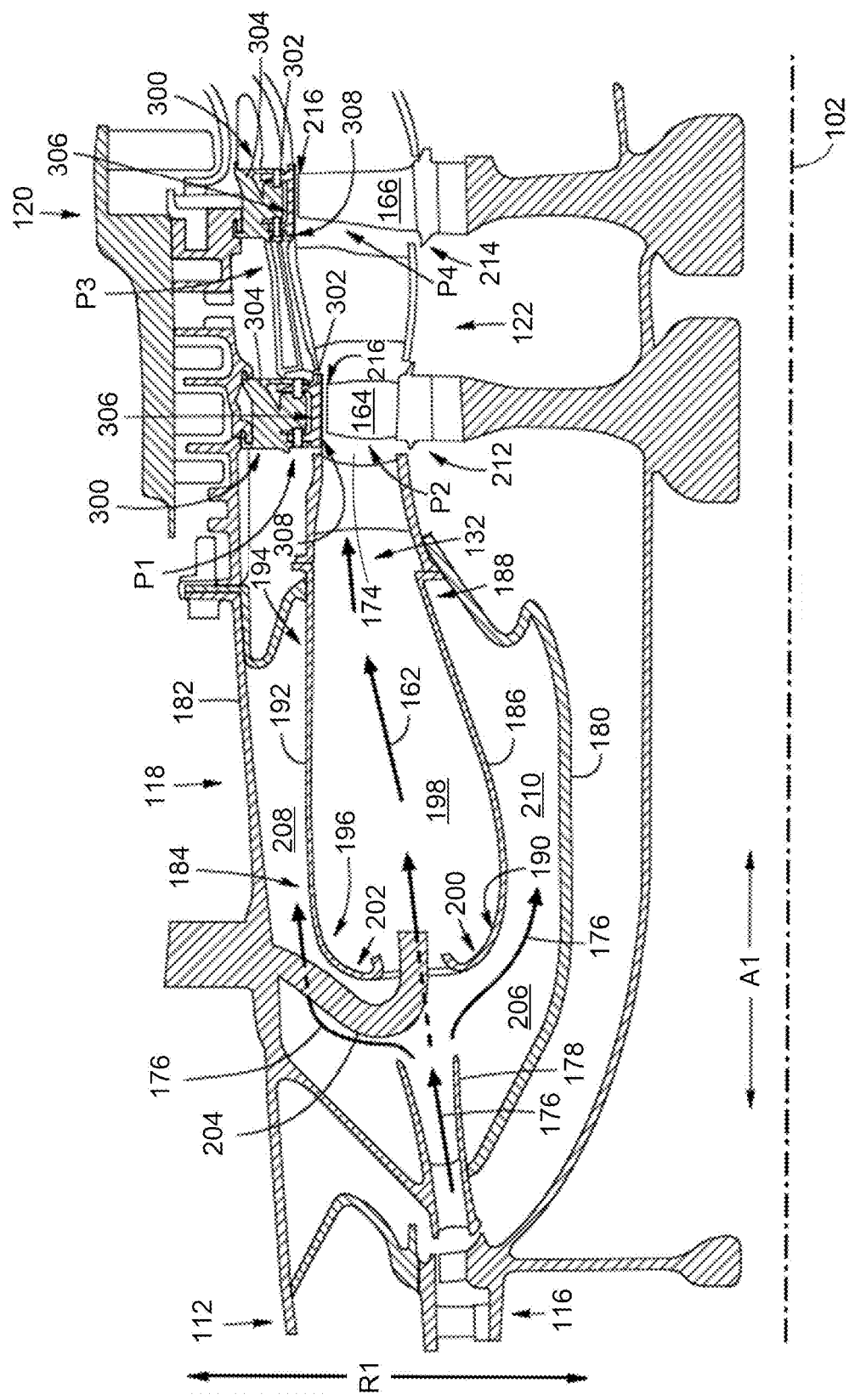
FIG. 2 is a side cross-sectional view of a compressor section, a combustion section, and a high pressure turbine section of the gas turbine engine shown in FIG. 1.

FIG. 2 provides a side cross-sectional view of the compressor section 112, combustion section 118, and the turbine section 120 of the core turbine engine 106 of FIG. 1. More specifically, the rear end of the HP compressor 116, the combustor section 118, and the forward end of the HP turbine 122 are illustrated.

Compressed air 176 exits the HP compressor 116 through a diffuser 178 located at the rear end or outlet of the HP compressor 116 and diffuses into the combustion section 118. The combustion section 118 of core turbine engine 106 is annularly encased by radially inner and outer combustor casings 180, 182. The radially inner combustor casing 180 and the radially outer combustor casing 182 both extend generally along the axial direction A1 and surround a combustor assembly 184 in annular rings. The inner and outer combustor casings 180, 182 are joined together at annular diffuser 178 at the forward end of the combustion section 118.

As shown, the combustor assembly 184 generally includes an inner liner 186 extending between a rear end 188 and a forward end 190 generally along the axial direction A1, as well as an outer liner 192 also extending between a rear end 194 and a forward end 196 generally along the axial direction A1. The inner and outer liners 186, 192 together at least partially define a combustion chamber 198 therebetween. The inner and outer liners 186, 192 are each attached to or formed integrally with an annular dome. More particularly, the annular dome includes an inner dome section 200 formed integrally with the forward end 190 of the inner liner 186 and an outer dome section 202 formed generally with the forward end 196 of the outer liner 192. Further, the inner and outer dome section 200, 202 may each be formed integrally (or alternatively may be formed of a plurality of components attached in any suitable manner) and may each extend along a circumferential direction to define an annular shape. It should be appreciated, however, that in other embodiments, the combustor assembly 184 may not include the inner and/or outer dome sections 200, 202; may include separately formed inner and/or outer dome sections 200, 202 attached to the respective inner liner 186 and outer liner 192; or may have any other suitable configuration.

Referring still to FIG. 2, the combustor assembly 184 further includes a plurality of fuel air mixers 204 spaced along the circumferential direction and positioned at least partially within the annular dome. More particularly, the plurality of fuel air mixers 204 are disposed at least partially between the outer dome section 202 and the inner dome section 200 along the radial direction R1. Compressed air 176 from the compressor section 112 of the gas turbine engine 100 flows into or through the fuel air mixers 204, where the compressed air 176 is mixed with fuel and ignited to create combustion gases 162 within the combustion chamber 198. The inner and outer dome sections 200, 202 are configured to assist in providing such a flow of compressed air 176 from the compressor section 112 into or through the fuel air mixers 204.

As discussed above, the combustion gases 162 flow from the combustion chamber 198 into and through the turbine section 120 of the gas turbine engine 100, where a portion of thermal and/or kinetic energy from the combustion gases 162 is extracted via sequential stages of turbine stator vanes and turbine rotor blades within the HP turbine 122 and LP turbine 124. More specifically, as is depicted in FIG. 2, combustion gases 162 from the combustion chamber 198 flow into the HP turbine 122, located immediately downstream of the combustion chamber 198, where thermal and/or kinetic energy from the combustion gases 162 is extracted via sequential stages of HP turbine rotor blades 164, 166.

As illustrated in FIG. 2, not all compressed air 176 flows into or directly through the fuel air mixers 204 and into combustion chamber 198. Some of the compressed air 176 is discharged into a plenum 206 surrounding the combustor assembly 184. Plenum 206 is generally defined between the combustor casings 180, 182 and the liners 186, 192. The outer combustor casing 182 and the outer liner 192 define an outer plenum 208 generally disposed radially outward from the combustion chamber 198. The inner combustor casing 180 and the inner liner 186 define an inner plenum 210 generally disposed radially inward with respect to the combustion chamber 198. As compressed air 176 is diffused by diffuser 178, some of the compressed air 176 flows radially outward into the outer plenum 208 and some of the compressed air 176 flows radially inward into the inner plenum 210.

The compressed air 176 flowing radially outward into the outer plenum 208 flows generally axially to the turbine section 120. Specifically, the compressed air 176 flows above the HP turbine 122 stator vanes and rotor blades 164, 166. The outer plenum 208 may extend to the LP turbine 124 (FIG. 1) as well.

As further shown in FIG. 2, the HP turbine 122 includes one or more shroud assemblies 300, each of which forms an annular shroud ring about an annular array of HP turbine rotor blades 164 and 166. In this example, an annular shroud ring is circumferentially disposed around the annular array of rotor blades 164 of a first stage 212 of HP turbine 122, and an annular ring is circumferentially disposed around the annular array of turbine rotor blades 166 of the second stage 214. In general, the annular shrouds of the shroud assemblies 300 are radially spaced from blade tips 216 of each of the rotor blades 164 and 166. The shroud assemblies 300 generally reduce radial leakage into and out of the core air flowpath 132 and may also reduce axial leakage.

It should be noted that shroud assemblies 300 may additionally be utilized in a similar manner in the LP compressor 114, HP compressor 116, and/or LP turbine 124. Accordingly, shroud assemblies 300 as disclosed herein are not limited to use in HP turbines 122, and rather may be utilized in any suitable section of gas turbine engine 100 or turbine engine more generally. The shroud assembly 300 includes an annular shroud 302 coupled with a shroud support 304. The shroud support 304 may be a hanger. Shroud support 304 is coupled with and supports the annular shroud 302 in the gas turbine engine 100, and is itself supported by various other components in the gas turbine engine 100. The shroud support 304 may be a multi-piece hanger or may be formed of a single piece. In an exemplary embodiment, shroud support 304 is a single-piece hanger. The annular shroud 302 includes a radially inner side 308 facing one or more blade tips 216.

The compressed air 176 flowing through the outer plenum 208 has a pressure P1 or P3 that exerts a radially inward force on the outer side 306 of annular shroud 302. The combustion gases 162 flowing through the hot gas path 174 of the HP turbine 122 have a pressure P2 or P4 that exerts a radially outward force on the inner side 308 of the shroud segment 302. It will be appreciated that P1 is generally greater than P2 and that P3 is generally greater than P4 during operation of gas turbine engine 100 with respect to this section of the core turbine engine 106. It will also be appreciated that in some circumstances, such as when gas turbine engine 100 is not in operation or when gas turbine engine 100 experiences a stall, that P1 may not be greater than P2 and/or that P3 may not be greater than P4.

In some embodiments, components of the gas turbine engine 100, particularly components within hot gas path such as components within the combustion section or downstream thereof, may comprise a ceramic matrix composite (CMC) material, which is a non-metallic material having high temperature capability. For example, the annular shroud 302 can be formed from a CMC material. In general, turbine performance and efficiency may be improved by increased combustion gas temperatures; therefore, non-traditional high temperature materials, such as CMC materials, are more commonly being used for various components within gas turbine engines, including components within the flow path of the combustion gases. Exemplary CMC materials utilized for gas turbine engine components may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition. In other embodiments, the CMC material may be formed as, e.g., a carbon fiber cloth rather than as a tape.

As stated, components comprising a CMC material may be used within the hot gas path, such as within the combustion and/or turbine sections of engine 100. However, CMC components may be used in other sections as well, such as the compressor and/or fan sections. As a particular example described in greater detail below, a turbine shroud may be formed from a CMC material to better withstand the increased combustion gas temperatures.

Figure 3:
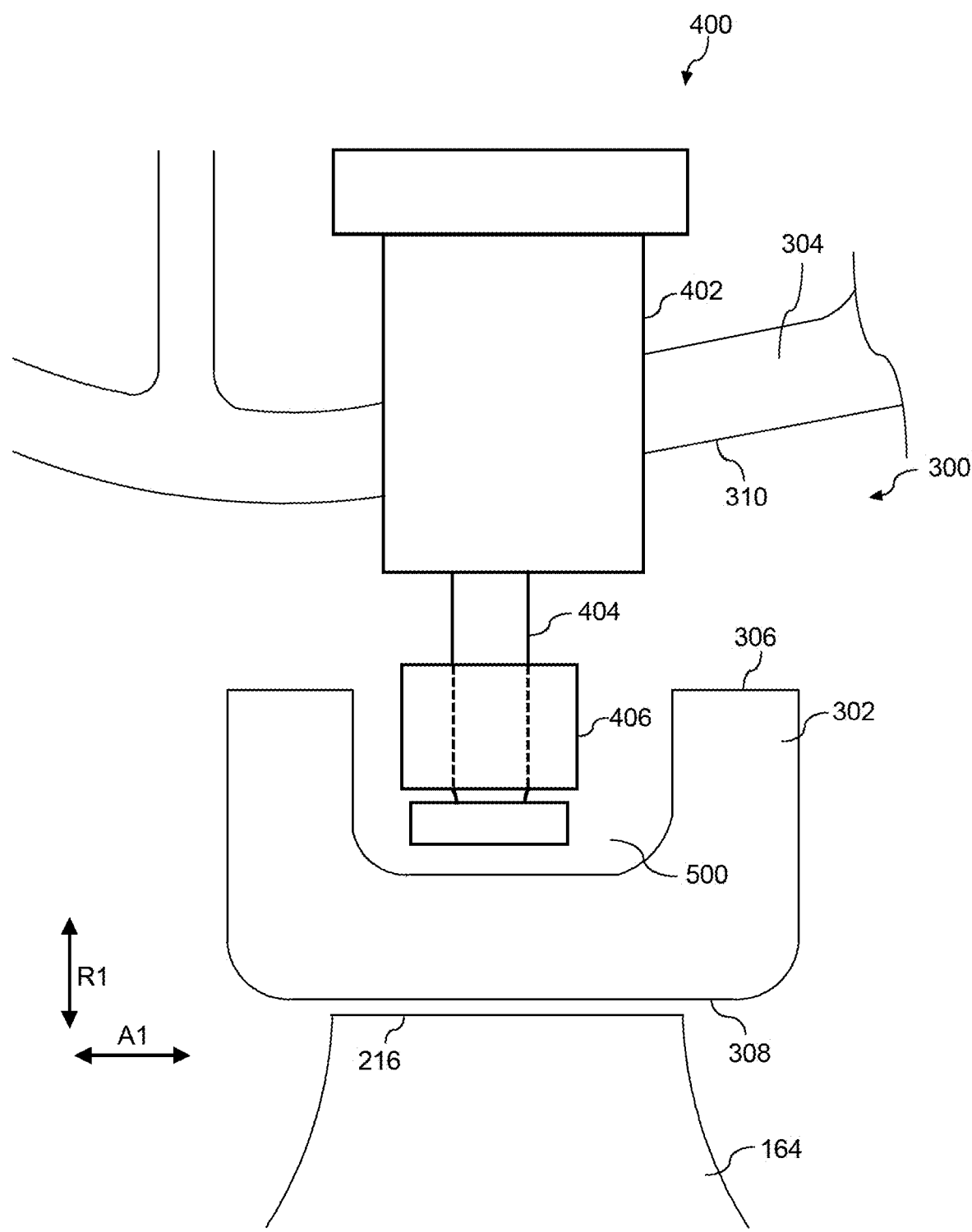
FIG. 3 is a cross-sectional view of a shroud assembly according to various embodiments of the present disclosure.

FIG. 3 provides a cross-sectional view of an exemplary shroud assembly 300. Shroud assembly 300 is positioned in at least one of the compressor section 112 and/or the turbine section 120 and at least partially defines the core air flowpath 132. By way of example, shroud assemblies 300 can be located circumferentially enclosing the rotor blades 164 and 166 of HP turbine 122, as shown in FIG. 2. In other embodiments, shroud assemblies 300 can be located in other sections or locations within gas turbine engine 100.

For this embodiment, the shroud assembly 300 includes an annular shroud 302 coupled with a shroud support 304. The shroud support 304 includes a radially inner side 310 that faces the outer side 306 of the annular shroud 302. The annular shroud 302 includes a radially inner side 308 facing one or more blade tips 216 of rotor blade 164. The annular shroud includes one or more shroud retention features 500.

One or more pins 400 are used to secure the annular shroud 302 to the support structure 304. The pin 400 includes an outer pin 402 and an inner pin 404 having a block 406 thereon. The outer pin 402 can be secured to the support structure 304 with a tack weld, or any other suitable securing means. The block 406 is loosely fitted on the inner pin 404 such that the block 406 is capable of rotating about the inner pin 404 and is also capable of translating up and down the inner pin 404 in a radial direction. In embodiments, the outer pin 402 and the inner pin 404 may be integrally formed. While, in other embodiments, the inner pin 404 and the outer pin 402 may be two separate components that are later joined together, for example by press-fitting. The inner pin 404 is offset from a centerline of the outer pin 402. Offsetting the inner pin 404 from the center line of the outer pin 402 allows for securely maintaining centralization of the annular shroud 302 to the engine centerline. The offset inner pin 404 creates a camming mechanism, where rotation of the pin 400 translates the block 406. While the term "block" is used, the disclosure is not limited to only cuboidal- or rectangular-shaped blocks. For example, the block 406 can be any suitable shape so long as it is capable of engaging the annular shroud 302 and pin 400 according to various embodiments of the disclosure. For example, suitable block shapes could include rectangular, cuboidal, spherical and/or cylindrical blocks. Additional details regarding installation of the annular shroud 302 using one or more pins 400 disclosed herein will be further discussed below. Besides radially positioning the annular shroud 302, the pins 400 prevent the shroud from rotating about the engine centerline, while allowing for thermal radial and axial growth of the annular shroud 302.

Figure 4:
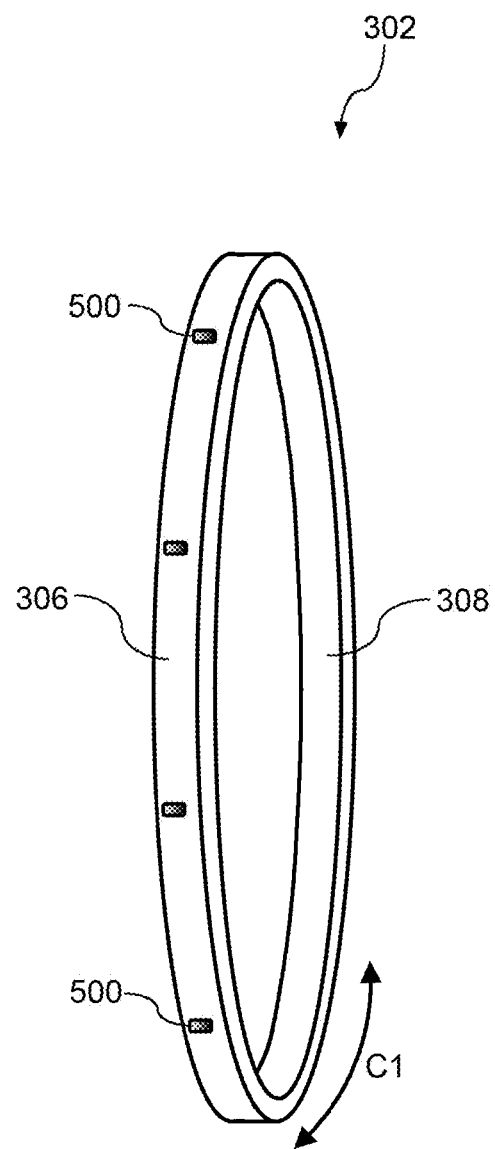
FIG. 4 is a perspective view of an annular shroud according to various embodiments of the present disclosure.

With reference now to FIG. 4, a perspective view an exemplary annular shroud 302 is shown. A circumferential direction C1 is shown. The annular shroud 302 includes a radially inner side 308 and one or more shroud retention features 500 disposed on the outer side 306 of annular shroud 302. The shroud retention features 500 include one or more of cavities, notches, slots, etc. The shroud retention feature 500 can be any shape suitable for disposing the block 406 within the shroud retention feature 500. For example, the shroud retention feature 500 can be square, rectangular, triangular, round, ovular, etc. As shown, the annular shroud 302 can include multiple shroud retention features 500 around the circumferential direction of the annular shroud 302. For example, in an exemplary embodiment the annular shroud 302 includes at least one shroud retention feature 500, such as at least two shroud retention features 500, such as at least three shroud retention features 500, such as at least four shroud retention features 500, such as at least five shroud retention features 500. The shroud retention features 500 can be spaced from each other about the circumferential direction of the annular shroud 302. For example, in embodiments the locations of the shroud retention features 500 can be spaced from each other around the circumferential direction C1 of the annular shroud 302. In certain embodiments, the shroud retention features 500 may be disposed equidistance from each other around the circumferential direction C1 of the annular shroud 302. However, in other embodiments one or more shroud retention features 500 may not be spaced equidistance from each other. For example, it is contemplated that one or more shroud retention features 500 could be spaced closer to each other around the circumferential direction C1 of the annular shroud 302, while other shroud retention features 500 are spaced farther apart from each other around the circumferential direction C1 of the annular shroud 302.

Figure 5:
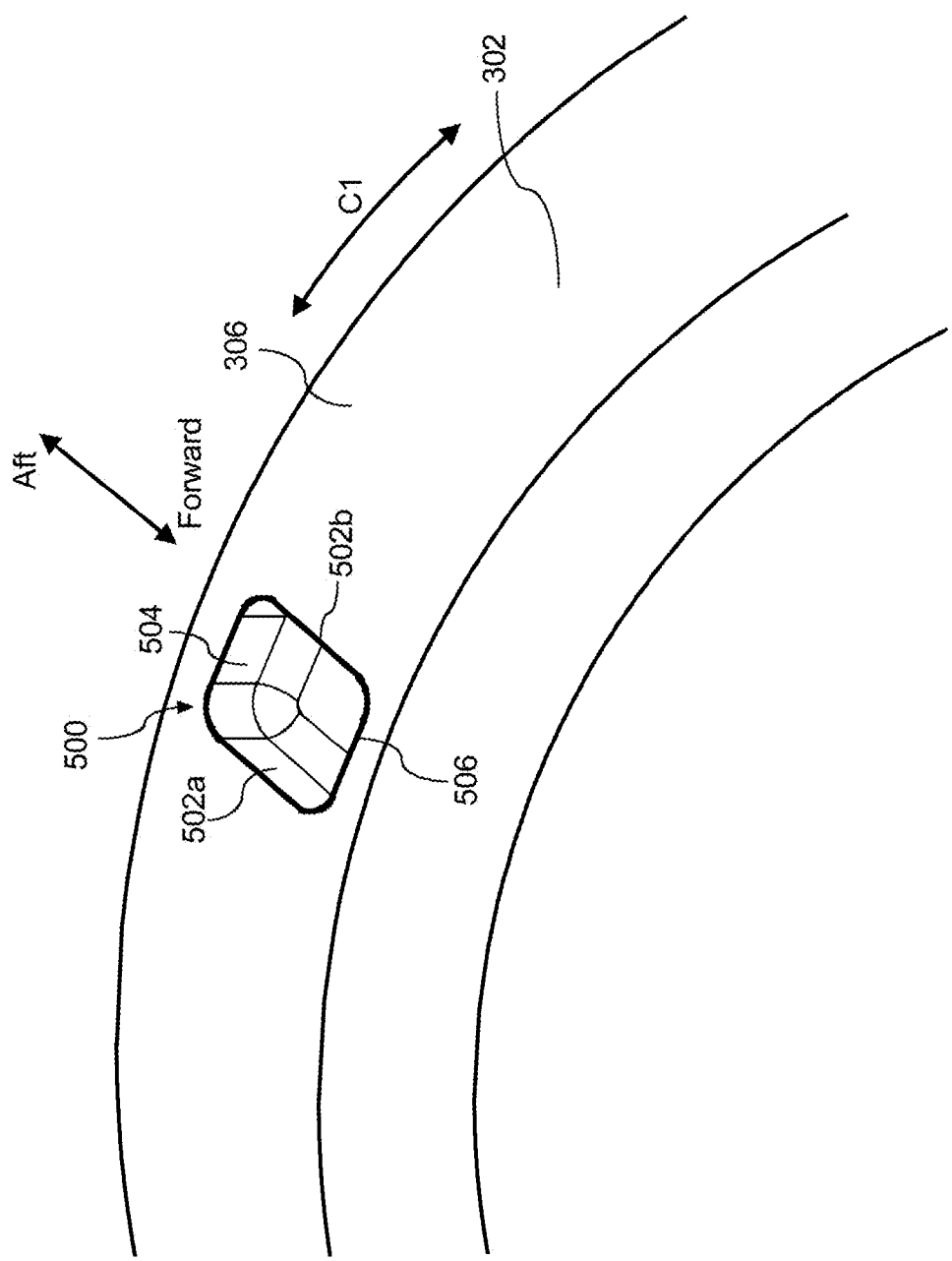
FIG. 5 is a magnified perspective view of an annular shroud according to various embodiments of the present disclosure.

Referring to FIG. 5, the outer side 306 of the annular shroud 302 includes one or more shroud retention features 500. As shown, the shroud retention features 500 can include one or more circumferential surfaces 502a, 502b, at least one aft surface 504, and at least one forward surface 506. The one or more circumferential surface 502a, 502b are located along the circumferential direction C1 of the annular shroud 302. The aft surface 504 is spaced apart from the forward surface 506. The one or more circumferential surfaces 502a, 502b, aft surface 504, and forward surface 506 form sides of the shroud retention feature 500 that extend radially into the annular shroud 302. While, the shroud retention feature 500 as shown in FIG. 5 is rectangular in nature, the disclosure is not so limited. Indeed, shroud retention features 500 could be formed from other shapes as long as the shape is suitable for engaging with pins 400 to secure the annular shroud 302 to the shroud support 304, as will be further discussed hereinbelow.

Figure 6:
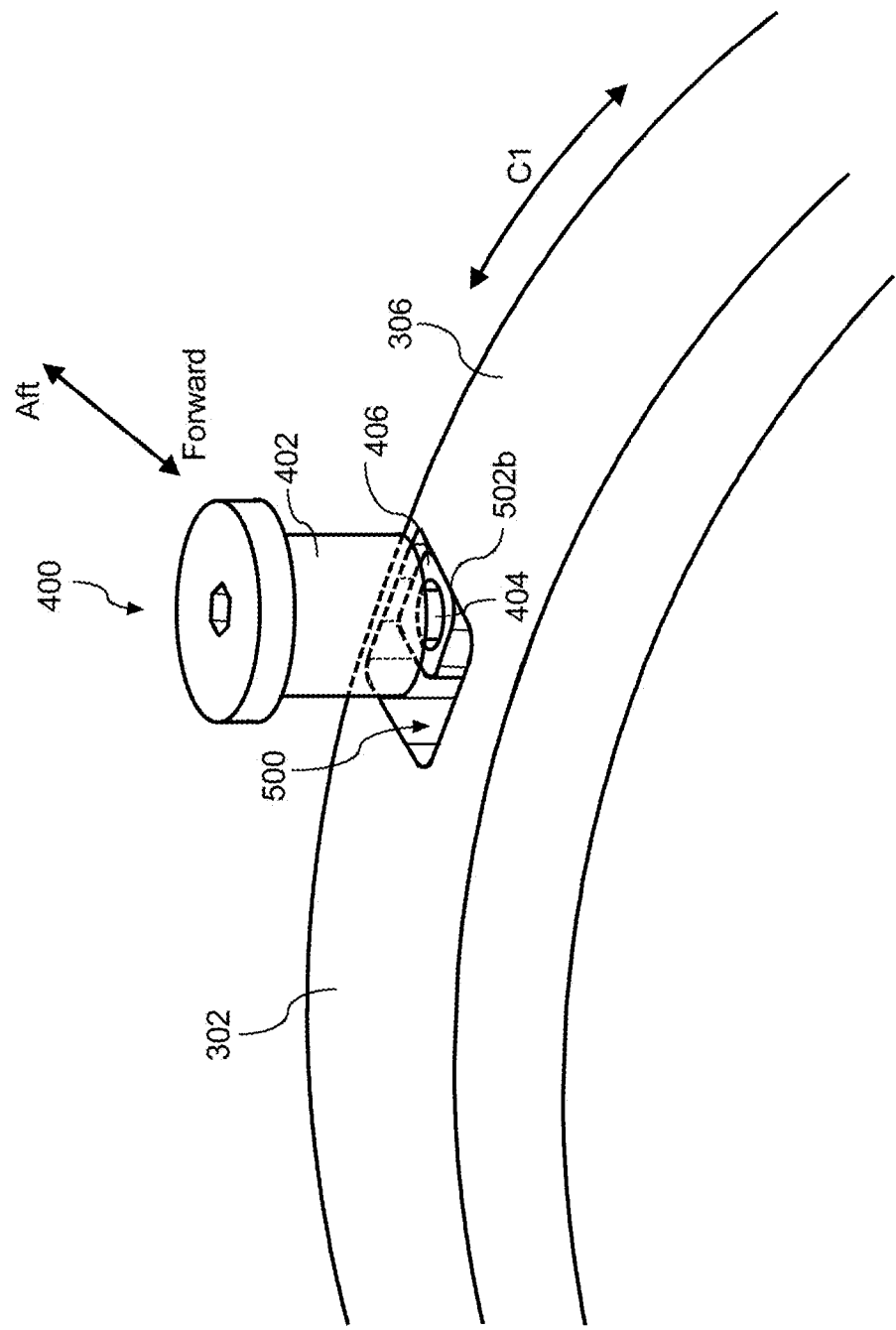
FIG. 6 is a perspective view of a portion of the shroud assembly according to various embodiments of the present disclosure.

As shown in FIG. 6, the pin 400 can be disposed in the shroud retention feature 500 located on the outer side 306 of the annular shroud 302. The pin 400 is disposed in the shroud retention feature 500, such that a portion of the block 406 disposed on the inner pin 404 contacts and frictionally engages one of the circumferential surfaces 502b of the shroud retention feature 500. As shown, a portion of the inner pin 404 may also be disposed within shroud retention feature 500, while no portion of the outer pin 402 is disposed within shroud retention feature 500.

Figure 7:
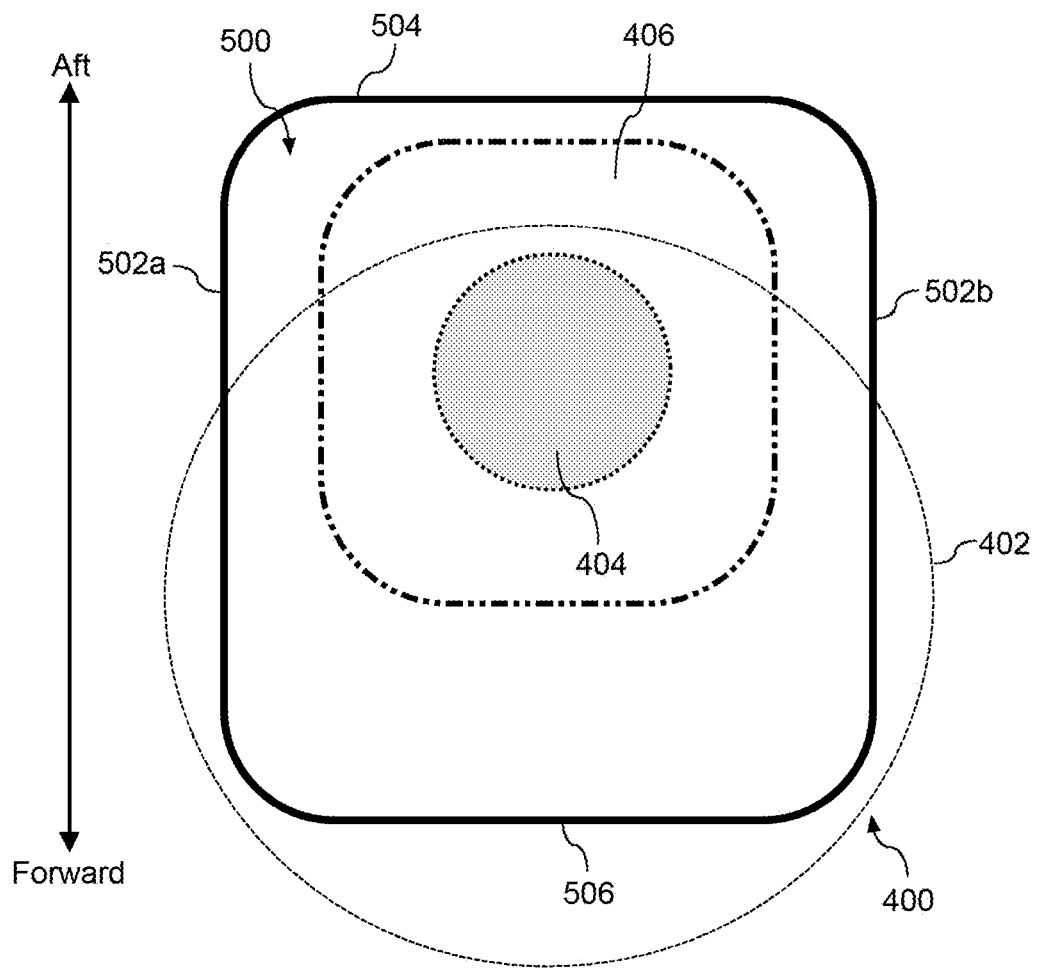
FIG. 7 is a top-down view of a shroud assembly according to various embodiments of the present disclosure.
Figure 8:
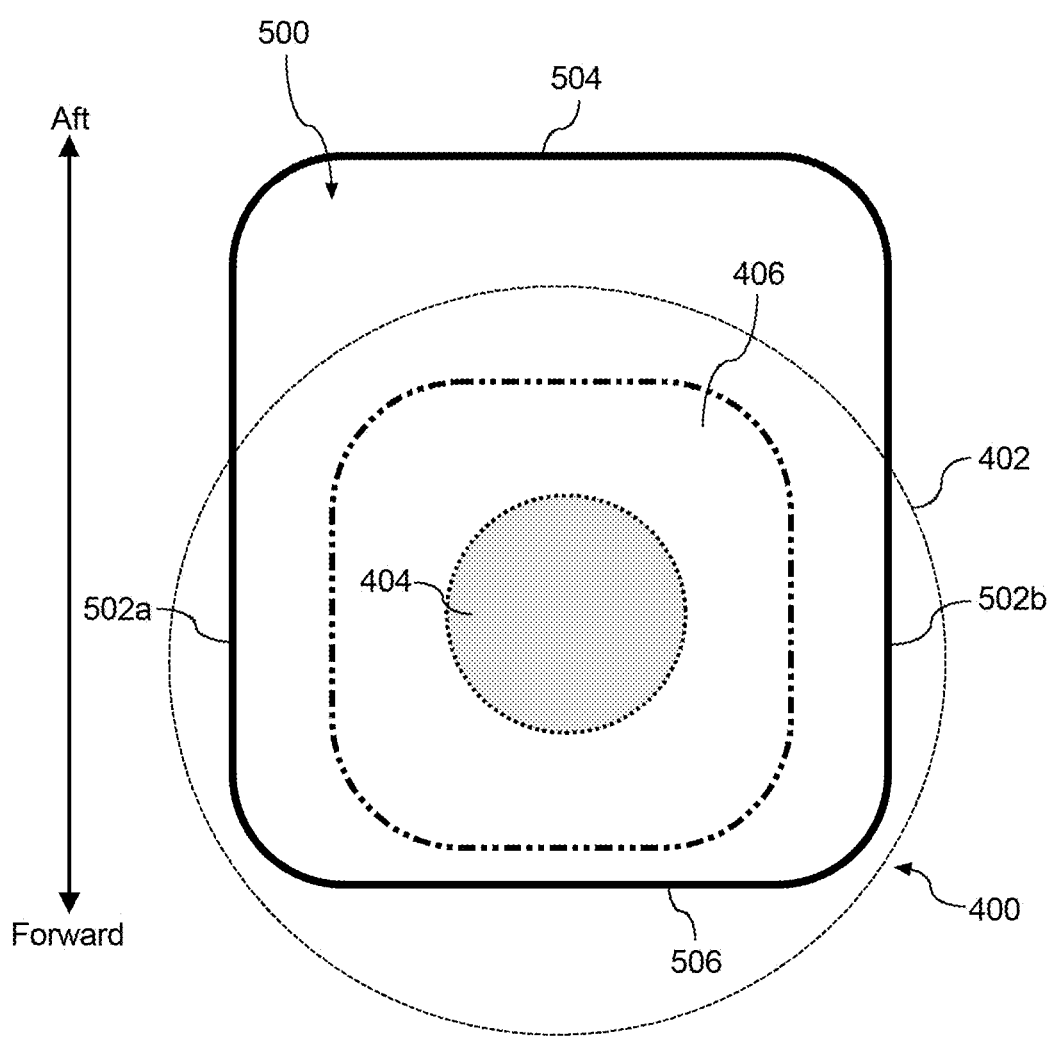
FIG. 8 is a top-down view of a shroud assembly according to various embodiments of the present disclosure.

FIGS. 7-8 illustrate schematic top down views of the pin 400 disposed within the shroud retention feature 500. Placement of the outer pin 402, inner pin 404, and block 406 are shown in the shroud retention feature 500. Specifically, placement of the block 406 is shown with respect to the circumferential surfaces 502a, 502b, aft surface 504, and forward surface 506. For example, FIG. 7 displays the block 406 in an aft position with respect to the outer pin 402 and the inner pin 404. FIG. 8, however, shows the block 406 in a forward position with respect to the outer pin 402 and the inner pin 404. As shown, the shroud retention feature 500 is sized such that the block 406 can be disposed therein in a variety of aft or forward positions without contacting the aft surface 504 or the forward surface 506 of the shroud retention feature 500.

Figure 9:
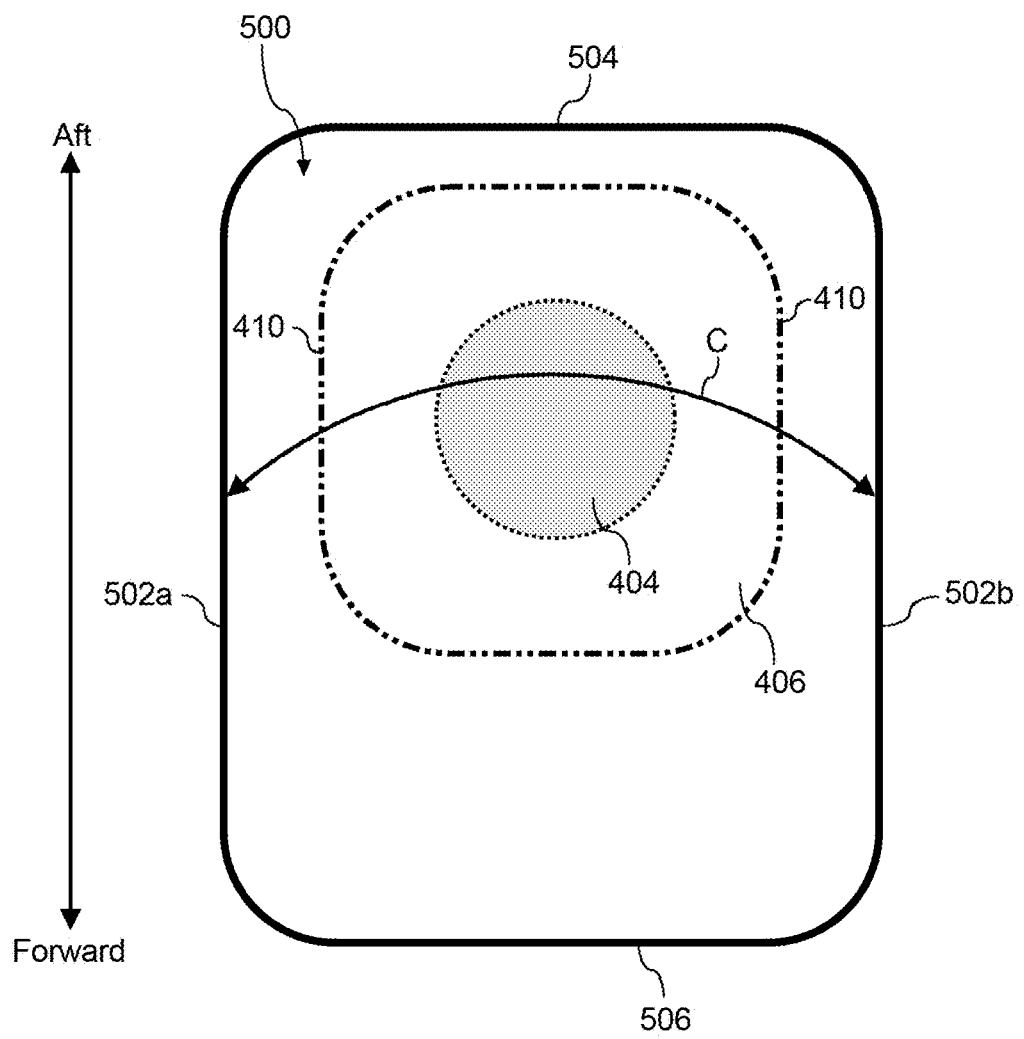
FIG. 9 is a top-down view of a portion of the shroud assembly according to various embodiments of the present disclosure.

Referring now to FIG. 9, rotation of the inner pin 404 translates the block 406 in a circumferential direction as shown by arrow C along an arc within the shroud retention feature 500. Given placement of the block within the shroud retention feature 500, the block 406 does not contact the aft surface 504 or the forward surface 506 of the shroud retention feature 500. Instead, the pin 400 can be rotated to a desired toque such that the shroud engagement surface 410 of the block 406 contacts one of the circumferential shroud surfaces 502a, 502b. Once engaged, the pin 400 can be tightened such that the frictional fit between the shroud engagement surface 410 and the circumferential surface 502a, 502b is secured.

Figure 10:
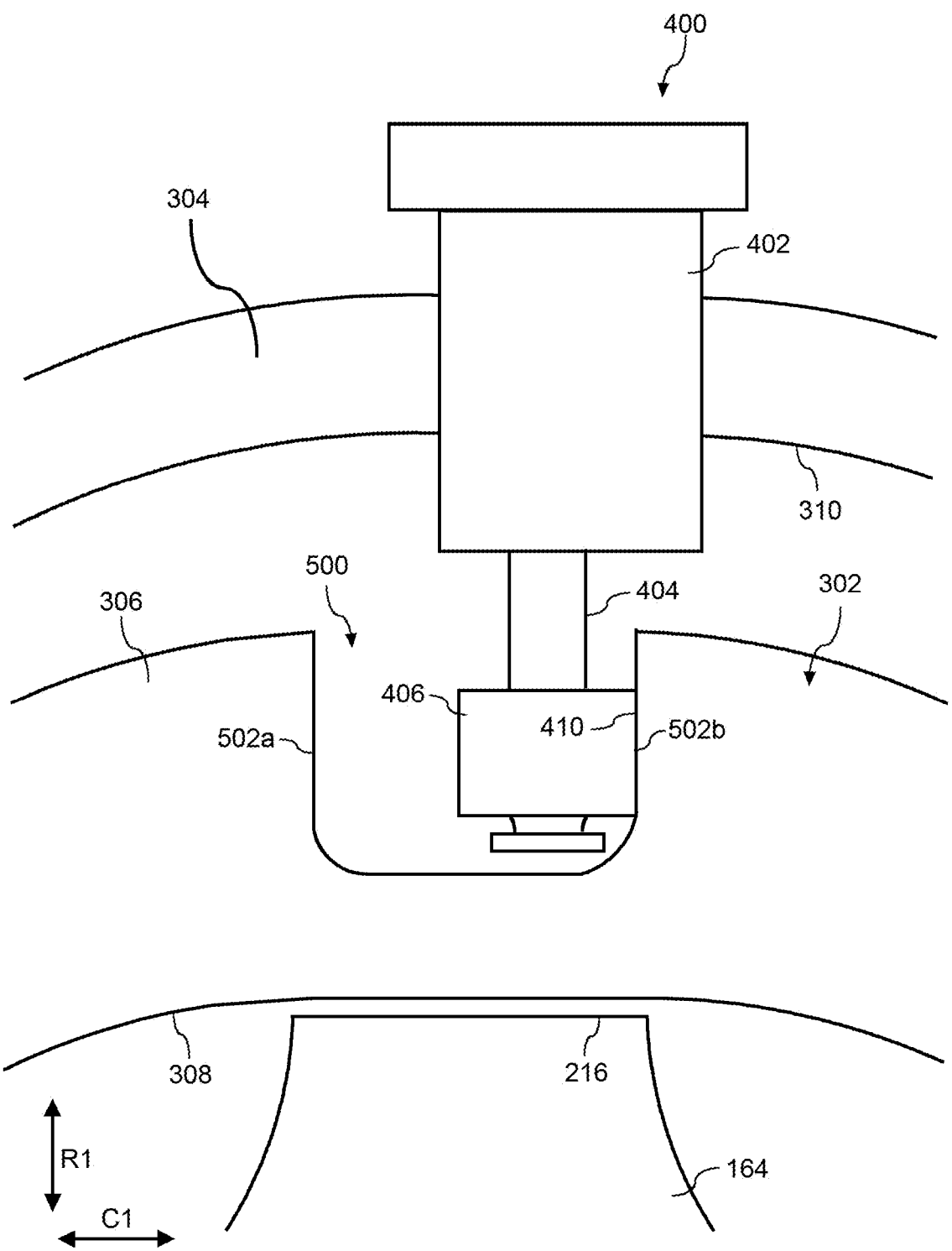
FIG. 10 is an axial view of a portion of the shroud assembly according to various embodiments of the present disclosure.
Figure 11:
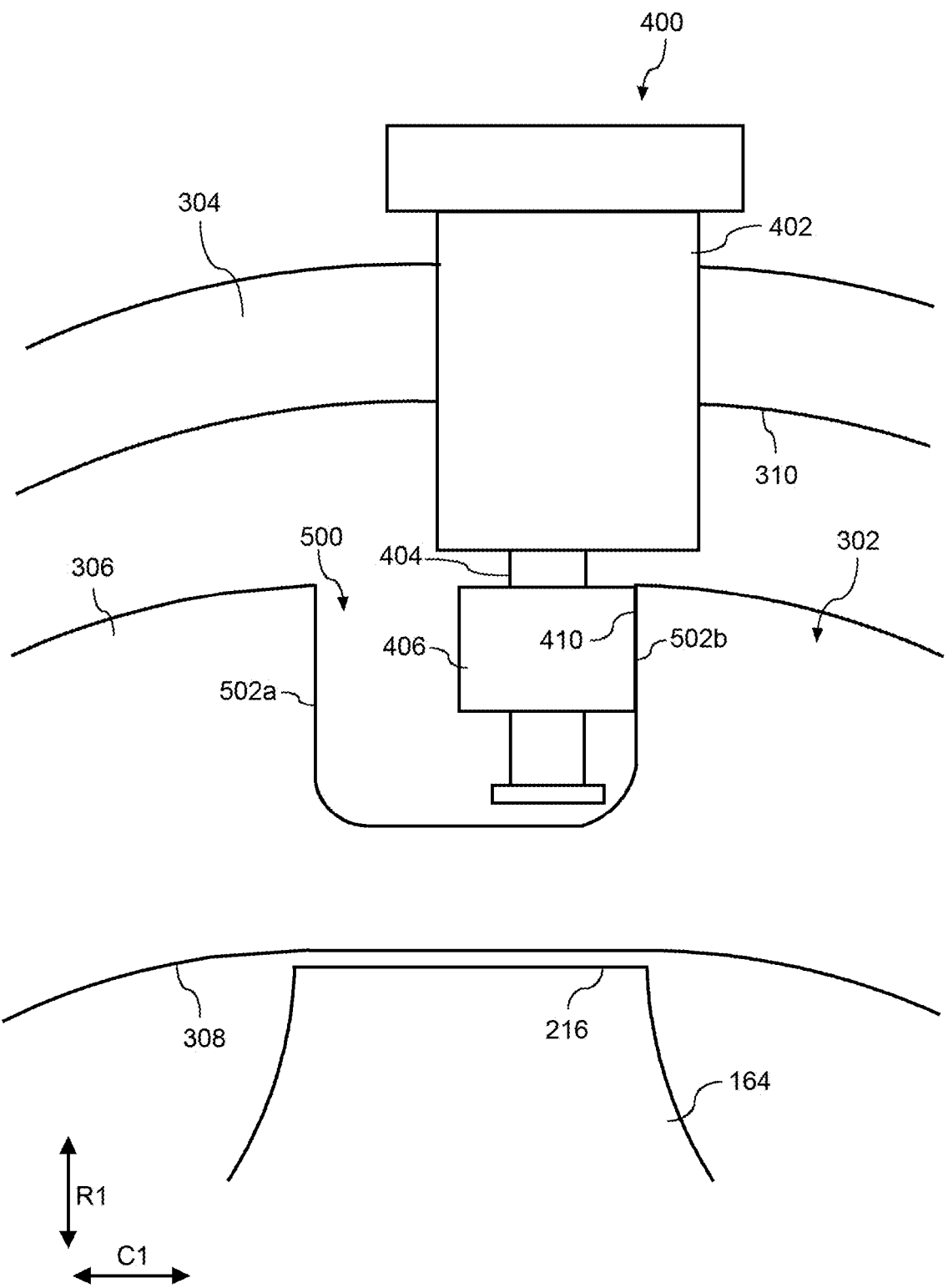
FIG. 11 is an axial view of a portion of the shroud assembly according to various embodiments of the present disclosure.

Referring now to FIGS. 10-11, axial views along the circumferential direction C1 are shown. The annular shroud 302 having an outer side 306 with a shroud retention feature 500 is secured to the shroud support 304 via a pin 400. The inner side 308 of the annular shroud 302 faces the blade tips 216 of the turbine blade 164. The outer side 306 of the annular shroud 302 faces the radially inner side 310 of the shroud support 304. The outer pin 402 is secured to the shroud support 304, while the inner pin 404 and block 406 are disposed within the shroud retention feature 500. The block 406 is able to move radially about the inner pin 404, thereby allowing for thermal expansion or contraction of the annular shroud 302. For example, the shroud engagement surface 410 of the block 406 is frictionally secured to circumferential surface 502b of the shroud retention feature 500. While the block 406 is shown as secured to circumferential surface 502b, in other embodiments, it would be feasible to secure the shroud engagement surface 410 of the block 406 to circumferential surface 502a. As the annular shroud 302 expands in the radial direction R1, the block 406 is able to translate in the radial direction R1 about the inner pin 404, such that both the annular shroud 302 and the block 406 move outward radially, as shown by the position of the block in FIG. 11. Similarly, during thermal contraction, both the annular shroud 302 and the block 406 can translate radially inward back to a block 406 position more similar to that as shown in FIG. 10. In other words, utilizing the pin 400 including the block 406 to secure the annular shroud 302 to the shroud support 304, allows for uniform contraction and expansion of the annular shroud 302 in the radial direction R1 while keeping the annular shroud 302 centered about axial centerline. Furthermore, given that the pins 400 are secured to circumferential surfaces 502a, 502b through block 406, the pins 400 prevent movement or rotation of the annular shroud 302 about the circumferential direction. Additionally, although not shown in the figures, it is contemplated that the annular shroud 302, or more specifically one of the circumferential surfaces 502a, 502b engaging the block 406, are capable of translating about the circumferential direction with respect to the shroud engagement surface 410 of the block 406. That is, the circumferential surfaces 502a, 502b are capable of translating in the circumferential direction with respect to the block 406, without the block 406 translating about the inner pin 404.

While the Figures provided illustrate single embodiments of the pin 400 and shroud retention features 500, the disclosure is not so limited. For instance, in exemplary embodiments, the number of pins 400 and shroud retention features 500 on the annular shroud 302 can be equal. For instance, the number of pins 400 used to secure the annular shroud 302 to the shroud support 304 can correspond to the number of shroud retention features 500 present on the annular shroud 302. In embodiments, given that the annular shroud 302 is a continuous annular shroud and it is desirable to maintain the radial position of the annular shroud 302, at least three shroud retention features 500 and at least three pins 400 can be used. In other embodiments, at least five shroud retention features 500 and at least five pins 400 can be used. It will be appreciated that any number of shroud retention features 500 and pins 400 can be used to radially secure the annular shroud 302 and the disclosure herein is not so limited.

In embodiments where multiple pins 400 are used to secure the annular shroud 302, the pins 400 can be rotated in either a clockwise or a counterclockwise direction in order to secure the block 406 within the shroud retention feature 500 as disclosed herein. Accordingly, in embodiments, where an even number of pins 400 are utilized, half of the pins can be secured in a counter-clockwise manner while the other half can be secured in a clockwise manner. In embodiments where an uneven number of pins 400 are used, half of the pins 400 can be secured in a counter-clockwise manner while the other half can be secured in a clockwise manner, with the remaining pin secured in either a clockwise or counterclockwise manner.

Figure 12:
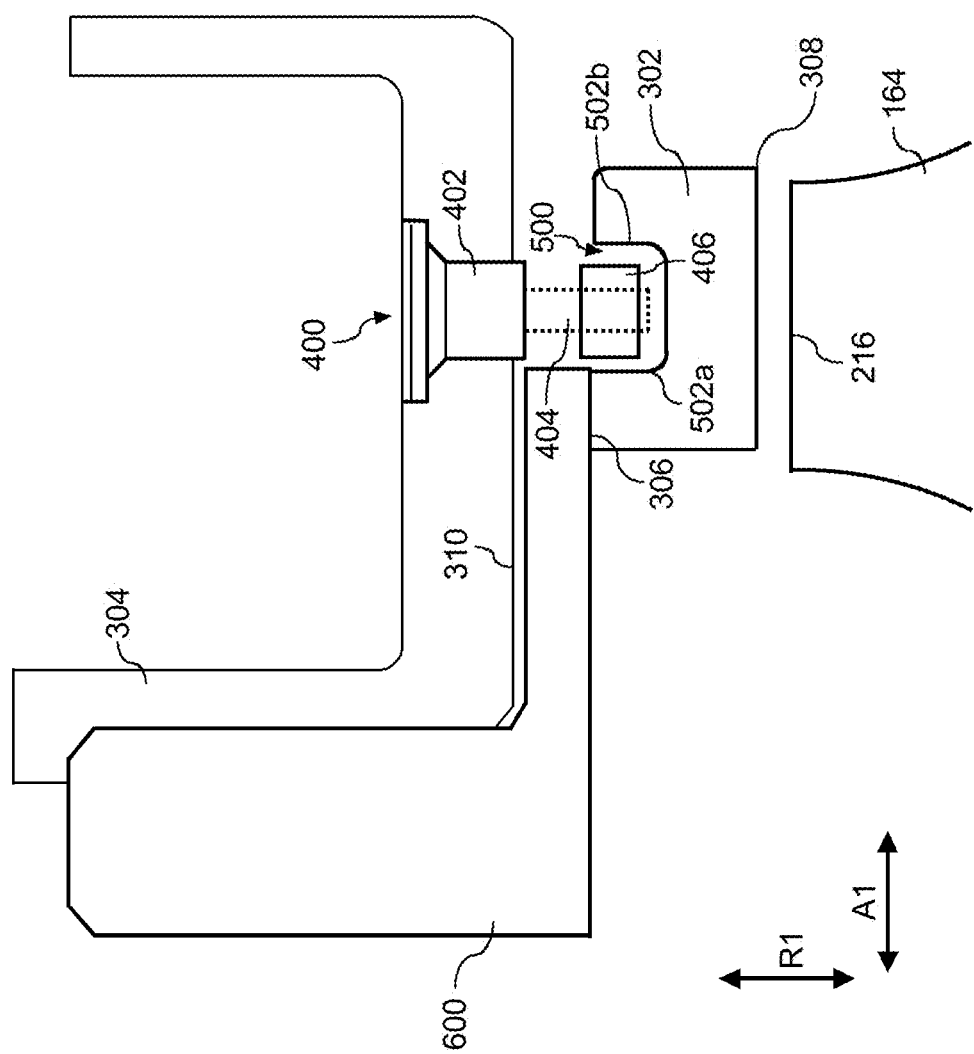
FIG. 12 is a cross-sectional view of a shroud assembly according to various embodiments of the present disclosure.

Also provided is a method for assembling a shroud assembly structure in a gas turbine engine. The method includes utilizing an annular shroud clearance tool 600 as shown in FIG. 12. For example, the annular shroud clearance tool 600 can be placed between the radially inner side 310 of the shroud support 304 and the radially outer side 306 of the annular shroud 302. The annular shroud 302 is placed between the radially inner side 310 of the shroud support 304. The radially inner side 308 of the annular shroud 302 faces the blade tip 216 of the turbine blade 164. One or more pins 400, including an outer pin 402, inner pin 404, and block 406, can then be placed within the shroud retention feature 500. The block 406 is disposed on the inner pin such that it is capable of rotating when the outer pin 402 is rotated. Accordingly, rotation of the outer pin 402, translates the block 406 in the circumferential direction, such that the block 406 can engage one or more circumferential surfaces 502a, 502b on the shroud retention feature 500, to secure the block 406 to the annular shroud 302. After, the annular shroud 302 is properly placed with respect to the shroud support 304, the pins 400 can be torqued and fastened and the annular shroud clearance tool 600 can be removed.

Accordingly, the method for assembling a shroud assembly structure in a gas turbine engine includes providing at least a portion of a gas turbine engine having one or more shroud support structures, the one or more shroud support structures having a radially inner surface; disposing an annular shroud clearance tool between the radially inner surface of the shroud support structure and an annular shroud to ensure clearance between the radially inner surface and the annular shroud, the annular shroud having one or more shroud retention features; disposing a block in the one or more shroud retention features, the block coupled to an inner pin that is coupled to an outer pin, the block capable of translating in the radial direction with respect to the inner pin; rotating the outer pin or inner pin to translate the block such that the block frictionally engages a circumferential surface on the one or more shroud retention features coupling the annular shroud to the block; optionally, adjusting a torque of the pin to further secure the annular shroud to the block; optionally, securing the outer pin to the shroud support structure; and removing the annular shroud clearance tool.

Further aspects of the invention are provided by the subject matter of the following clauses:

1. A shroud assembly defining an axial direction, a radial direction, and a circumferential direction, comprising; a shroud support; an annular shroud defining a radial centerline along the circumferential direction, the annular shroud comprising one or more retention features having a circumferential surface; and one or more pins each pin having an outer pin coupled to the shroud support and an inner pin disposed radially inward from the outer pin, the inner pin having a block thereon capable of radially translating along the inner pin, wherein the block engages the circumferential surface of the one or more retention features for securing the annular shroud to the shroud support.

2. The shroud assembly of any preceding clause wherein the inner pin is offset from a center line of the outer pin.

3. The shroud assembly of any preceding clause wherein the one or more retention features comprise a cavity formed in an outer surface of the annular shroud having a first circumferential surface, a second circumferential surface, a forward surface, and an aft surface, wherein the block engages one of the first circumferential surface or the second circumferential surface.

4. The shroud assembly of any preceding clause wherein the block comprises a shroud engagement surface for engaging the circumferential surface of the one or more retention features.

5. The shroud assembly of any preceding clause wherein the annular shroud comprises a plurality of retention features spaced from each other to align with the one or more pins around the circumferential direction of the annular shroud.

6. The shroud assembly of any preceding clause, wherein the block can translate in the radial direction with respect to the first pin due to thermal expansion or contraction of the annular shroud.

7. The shroud assembly of any preceding clause wherein the annular shroud comprises a ceramic matrix composite material.

8. The shroud assembly of any preceding clause wherein the annular shroud is disposed around one or more blades in a turbine section of a gas turbine engine.

9. The shroud assembly of any preceding clause wherein the annular shroud is disposed around one or more blades in the compressor section of a gas turbine engine.

10. The shroud assembly of any preceding clause wherein the first pin and the second pin are integrally formed.

11. The shroud assembly of any preceding clause wherein the annular shroud can uniformly expand and contract in the radial direction.

12. A gas turbine engine defining an axial direction, a radial direction, and a circumferential direction, comprising: a compressor section, a combustion section, and a turbine section in serial flow relationship and together defining a core air flowpath; and a shroud assembly positioned in at least one of the compressor section or the turbine section and at least partially defining the core air flowpath, the shroud assembly comprising a shroud support and an annular shroud defining a radial centerline along the circumferential direction; the annular shroud comprising one or more retention features having a circumferential surface configured to engage one or more pins for securing the annular shroud to the shroud support, each of the one or more pins having an outer pin coupled to the shroud support and an inner pin disposed radially inward from the outer pin, the inner pin having a block thereon capable of radially translating along the inner pin, wherein the block engages the circumferential surface of the one or more retention features for securing the annular shroud to the shroud support.

13. The gas turbine engine of any preceding clause wherein the inner pin is offset from a center line of the outer pin.

14. The gas turbine engine of any preceding clause wherein the one or more retention features comprise a cavity formed in an outer surface of the annular shroud having a first circumferential surface, a second circumferential surface, a forward surface, and an aft surface, wherein the block engages one of the first circumferential surface or the second circumferential surface.

15. The gas turbine engine of any preceding clause wherein the block comprises a shroud engagement surface for engaging the circumferential surface of the one or more retention features.

16. The gas turbine engine of any preceding clause wherein the annular shroud comprises a plurality of retention features spaced from each other to align with the one or more pins around the circumferential direction of the annular shroud.

17. The gas turbine engine of any preceding clause wherein the block can translate in the radial direction with respect to the first pin due to thermal expansion or compression of the annular shroud.

18. The gas turbine engine of any preceding clause wherein the annular shroud comprises a composite matrix material.

19. A method for assembling a shroud assembly structure in a gas turbine engine, the method comprising: providing at least a portion of a gas turbine engine having one or more shroud supports, the one or more shroud supports having a radially inner surface; disposing an annular shroud clearance tool between the radially inner surface of the shroud support and an annular shroud to ensure clearance between the radially inner surface and the annular shroud, the annular shroud having one or more shroud retention features; disposing a block in the one or more shroud retention features, the block coupled to an inner pin that is coupled to an outer pin, the block capable of translating in the radial direction with respect to the inner pin; rotating the outer pin or inner pin to translate the block such that the block frictionally engages a circumferential surface on the one or more shroud retention features coupling the annular shroud to the block; optionally, adjusting a torque of the pin to further secure the annular shroud to the block; optionally, securing the outer pin to the shroud support; and removing the annular shroud clearance tool.

20. The method of any preceding clause wherein the annular shroud can uniformly expand and contract in the radial direction.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A shroud assembly defining an axial direction, a radial direction, and a circumferential direction, comprising;
a shroud support;
an annular shroud defining a radial centerline along the circumferential direction, the annular shroud comprising one or more retention features having a circumferential surface; and
one or more pins, each pin having an outer pin coupled to the shroud support and an inner pin disposed radially inward from the outer pin, the inner pin having a block thereon capable of radially translating along the inner pin, wherein the inner pin is offset from a radial center line of the outer pin, wherein the block engages the circumferential surface of the one or more retention features for securing the annular shroud to the shroud support.

2. The shroud assembly of claim 1, wherein the one or more retention features comprise a cavity formed in an outer surface of the annular shroud having a first circumferential surface, a second circumferential surface, a forward surface, and an aft surface, wherein the block engages one of the first circumferential surface or the second circumferential surface.

3. The shroud assembly of claim 1, wherein the block comprises a shroud engagement surface for engaging the circumferential surface of the one or more retention features.

4. The shroud assembly of claim 1, wherein the annular shroud comprises a plurality of retention features spaced from each other to align with the one or more pins around the circumferential direction of the annular shroud.

5. The shroud assembly of claim 1, wherein the block can translate in the radial direction with respect to the first pin due to thermal expansion or contraction of the annular shroud.

6. The shroud assembly of claim 1, wherein the annular shroud comprises a ceramic matrix composite material.

7. The shroud assembly of claim 1, wherein the annular shroud is disposed around one or more blades in a turbine section of a gas turbine engine.

8. The shroud assembly of claim 1, wherein the annular shroud is disposed around one or more blades in the compressor section of a gas turbine engine.

9. The shroud assembly of claim 1, wherein the first pin and the second pin are integrally formed.

10. The shroud assembly of claim 1, wherein the annular shroud can uniformly expand and contract in the radial direction.

11. A gas turbine engine defining an axial direction, a radial direction, and a circumferential direction, comprising:
    a compressor section, a combustion section, and a turbine section in serial flow relationship and together defining a core air flowpath; and
    a shroud assembly positioned in at least one of the compressor section or the turbine section and at least partially defining the core air flowpath, the shroud assembly comprising a shroud support and an annular shroud defining a radial centerline along the circumferential direction;
    the annular shroud comprising one or more retention features having a circumferential surface configured to engage one or more pins for securing the annular shroud to the shroud support, each of the one or more pins having an outer pin coupled to the shroud support and an inner pin disposed radially inward from the outer pin, the inner pin having a block thereon capable of radially translating along the inner pin, wherein the inner pin is offset from a center line of the outer pin, and wherein the block engages the circumferential surface of the one or more retention features for securing the annular shroud to the shroud support.

12. The gas turbine engine of claim 11, wherein the one or more retention features comprise a cavity formed in an outer surface of the annular shroud having a first circumferential surface, a second circumferential surface, a forward surface, and an aft surface, wherein the block engages one of the first circumferential surface or the second circumferential surface.

13. The gas turbine engine of claim 11, wherein the block comprises a shroud engagement surface for engaging the circumferential surface of the one or more retention features.

14. The gas turbine engine of claim 11, wherein the annular shroud comprises a plurality of retention features spaced from each other to align with the one or more pins around the circumferential direction of the annular shroud.

15. The gas turbine engine of claim 11, wherein the block can translate in the radial direction with respect to the first pin due to thermal expansion or compression of the annular shroud.

16. The gas turbine engine of claim 11, wherein the annular shroud comprises a composite matrix material.

17. A method for assembling a shroud assembly structure in a gas turbine engine, the method comprising:
    providing at least a portion of a gas turbine engine having one or more shroud supports, the one or more shroud supports having a radially inner surface;
    disposing an annular shroud clearance tool between the radially inner surface of the shroud support and an annular shroud to ensure clearance between the radially inner surface and the annular shroud, the annular shroud having one or more shroud retention features;
    disposing a block in the one or more shroud retention features, the block coupled to an inner pin that is coupled to an outer pin, wherein the inner pin is offset from a center line of the outer pin, the block capable of translating in the radial direction with respect to the inner pin;
    rotating the outer pin or inner pin to translate the block such that the block frictionally engages a circumferential surface on the one or more shroud retention features coupling the annular shroud to the block;
    optionally, adjusting a torque of the pin to further secure the annular shroud to the block;
    optionally, securing the outer pin to the shroud support; and
    removing the annular shroud clearance tool.

18. The method of claim 17, wherein the annular shroud can uniformly expand and contract in the radial direction.

* * * * *